US012323208B2

(12) United States Patent
Zhang et al.

(10) Patent No.: US 12,323,208 B2
(45) Date of Patent: Jun. 3, 2025

(54) UPLINK TRANSMISSION WITH REPETITIONS

(71) Applicant: Apple Inc., Cupertino, CA (US)

(72) Inventors: Yushu Zhang, Beijing (CN); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Jie Cui, San Jose, CA (US); Manasa Raghavan, Sunnyvale, CA (US); Qiming Li, Beijing (CN); Seyed Ali Akbar Fakoorian, San Diego, CA (US); Sigen Ye, San Diego, CA (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/754,569

(22) PCT Filed: Apr. 6, 2021

(86) PCT No.: PCT/CN2021/085648
§ 371 (c)(1),
(2) Date: Apr. 6, 2022

(87) PCT Pub. No.: WO2022/213260
PCT Pub. Date: Oct. 13, 2022

(65) Prior Publication Data
US 2024/0072862 A1    Feb. 29, 2024

(51) Int. Cl.
*H04B 7/06* (2006.01)
*H04B 7/0408* (2017.01)
(Continued)

(52) U.S. Cl.
CPC ......... *H04B 7/0626* (2013.01); *H04B 7/0408* (2013.01); *H04W 72/02* (2013.01); *H04W 72/232* (2023.01)

(58) Field of Classification Search
CPC .... H04B 7/0626; H04B 7/0408; H04B 7/022; H04B 7/0404; H04W 72/02;
(Continued)

(56) References Cited

U.S. PATENT DOCUMENTS

2020/0106559 A1    4/2020  Vilaipornsawai et al.
2022/0361162 A1*  11/2022  Zhang .................. H04L 1/1854
(Continued)

FOREIGN PATENT DOCUMENTS

| CN | 105850057 | 8/2016 |
| CN | 111092697 | 5/2020 |
| WO | 2020/041269 | 2/2020 |

OTHER PUBLICATIONS

Qualcomm Incorporated, "Enhancements of Multi-TRP for PDCCH, PUCCH and PUSCH", 3GPP TSG-RAN WG1 Meeting #104-e, R1-2101447, Jan. 19, 2021, 28 sheets.
(Continued)

*Primary Examiner* — Afshawn M Towfighi
(74) *Attorney, Agent, or Firm* — Fay Kaplun & Marcin, LLP

(57) ABSTRACT

Embodiments of the present disclosure relate to uplink transmission with repetitions. According to embodiments of the present disclosure, a user equipment (UE) comprises a transceiver configured to communicate with a network; and a processor communicatively coupled to the transceiver and configured to perform operations. The operations comprise determining first Channel State Information (CSI) and second CSI based on at least one of a previous channel and interference measurement or a latest channel and interfer-
(Continued)

ence measurement. The operations further comprise transmitting the first CSI via the transceiver to the network with a first beam, the first CSI multiplexed with a first repetition of an uplink transmission with the first beam. The operations further comprise transmitting the second CSI via the transceiver to the network with a second beam, the second CSI multiplexed with a second repetition of the uplink transmission with the second beam.

20 Claims, 10 Drawing Sheets

(51) Int. Cl.
*H04W 72/02* (2009.01)
*H04W 72/232* (2023.01)

(58) Field of Classification Search
CPC ...... H04W 72/232; H04L 1/0026; H04L 1/06; H04L 1/189; H04L 5/0023; H04L 5/0048; H04L 5/0057; H04L 5/0091; H04L 1/08
See application file for complete search history.

(56) References Cited

U.S. PATENT DOCUMENTS

| 2023/0057169 A1* | 2/2023 | Li | H04L 5/0057 |
| 2024/0032029 A1* | 1/2024 | Zhang | H04B 7/0626 |

OTHER PUBLICATIONS

Moderator (Nokia), "Summary #3 of Multi-TRP for PUCCH and PUSCH", 3GPP TSG RAN WG1 #104-e, R1-2102060, Feb. 5, 2021, 43 sheets.

Moderator, "Summary of Multi-TRP URLLC for PUCCH and PUSCH"; 3GPP TSG RAN WG1 #103, R1-2009480, Nov. 3, 2020, 70 sheets.

Apple Inc., "On Multi-TRP Reliability Enhancement"; 3GPP TSG-RAN WG1 Meeting #103-e, R1-2008439, Oct. 24, 2020, 10 sheets.

* cited by examiner

UPLINK TRANSMISSION WITH REPETITIONS

TECHNICAL FIELD

Embodiments of the present disclosure generally relate to the field of telecommunications, and in particular, to uplink transmission with repetitions.

BACKGROUND

In Release 15 and Release 16, Physical Uplink Shared Channel (PUSCH) transmissions with multiple repetitions are supported and all the repetitions should be transmitted with the same digital precoder and beam. In Release 17, PUSCH transmission with multiple repetitions with different digital precoders and beams are supported. A user equipment (UE) may transmit Channel State Information (CSI) multiplexed with the repetitions to a network. There is a need to discuss how to transmit the CSI for corresponding repetitions.

SUMMARY

In general, example embodiments of the present disclosure provide a solution for uplink transmission with repetitions.

In a first aspect, there is provided a UE. The UE comprises a transceiver and a processor. The transceiver is configured to communicate with a network. The processor is communicatively coupled to the transceiver and configured to perform operations comprising: determining first Channel State Information (CSI) and second CSI based on at least one of a previous channel and interference measurement or a latest channel and interference measurement; transmitting the first CSI via the transceiver to the network with a first beam, the first CSI multiplexed with a first repetition of an uplink transmission with the first beam; and transmitting the second CSI via the transceiver to the network with a second beam, the second CSI multiplexed with a second repetition of the uplink transmission with the second beam.

In a second aspect, there is provided a UE. The UE comprises a transceiver and a processor. The transceiver is configured to communicate with a network. The processor is communicatively coupled to the transceiver and configured to perform operations comprising: receiving first information concerning at least one group of beams and digital precoders via the transceiver from the network; generating repetitions of an uplink transmission based on the first information; and transmitting the repetitions via the transceiver to the network.

In a third aspect, there is provided a base station (BS). The BS comprises a transceiver and a processor. The transceiver is configured to communicate with a network. The processor is communicatively coupled to the transceiver and configured to perform operations comprising: transmitting first information concerning at least one group of beams and digital precoders via the transceiver to the UE; and receiving repetitions of an uplink transmission via the transceiver from the UE, the repetitions generated based on the first information.

In a fourth aspect, there is provided a baseband processor of a UE. The baseband processor is configured to perform operations comprising: determining first Channel State Information (CSI) and second CSI based on at least one of a previous channel and interference measurement or a latest channel and interference measurement; transmitting the first CSI via the transceiver to the network with a first beam, the first CSI multiplexed with a first repetition of an uplink transmission with the first beam; and transmitting the second CSI via the transceiver to the network with a second beam, the second CSI multiplexed with a second repetition of the uplink transmission with the second beam.

In a fifth aspect, there is provided a baseband processor of a UE. The baseband processor is configured to perform operations comprising: receiving first information concerning at least one group of beams and digital precoders via the transceiver from the network; generating repetitions of an uplink transmission based on the first information; and transmitting the repetitions via the transceiver to the network.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
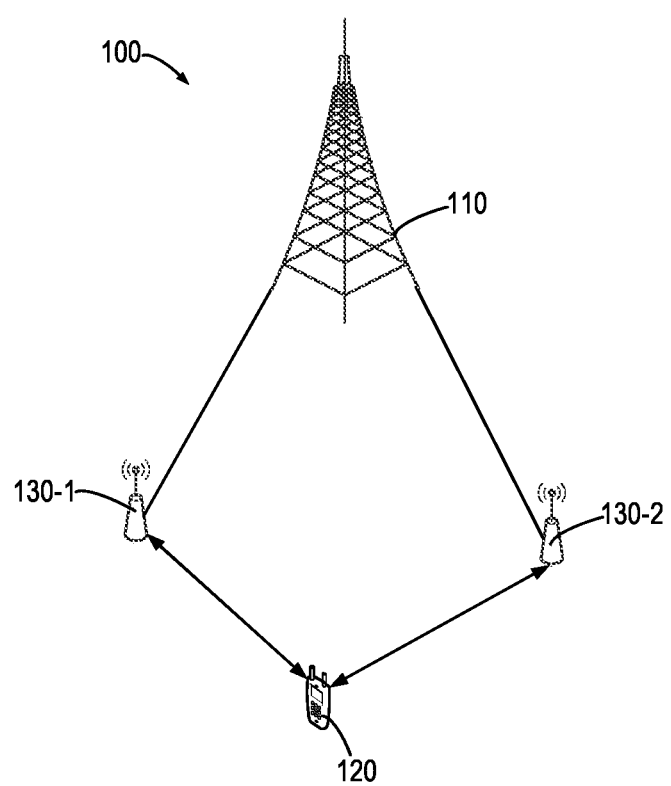
FIG. 1 shows an example communication network in which example embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

The terminology used herein is for the purpose of describing particular embodiments only and is not intended to be limiting of example embodiments. For example, as used herein, the singular forms "a", "an" and "the" are intended to include the plural forms as well, unless the context clearly indicates otherwise. The terms "comprises", "comprising", "has", "having", "includes" and/or "including", when used herein, specify the presence of stated features, elements, and/or components etc., but do not preclude the presence or addition of one or more other features, elements, components and/or combinations thereof. Moreover, when a particular feature, structure, or characteristic is described in connection with some embodiments, it is submitted that it is within the knowledge of one skilled in the art to affect such feature, structure, or characteristic in connection with other embodiments whether or not explicitly described.

It is also to be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

FIG. 1 shows an example communication network 100 in which embodiments of the present disclosure can be implemented. The network 100 includes a BS 110 and a UE 120 served by the BS 110. The network 100 may provide one or more serving cells to serve the UE 120. It is to be understood that the number of BSs and UEs is only for the purpose of illustration without suggesting any limitations to the present disclosure. The network 100 may include any suitable number of BSs and UEs adapted for implementing implementations of the present disclosure.

The communications in the network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

The BS 110 may be equipped with one or more TRPs. The TRP may also be referred to as a "panel", which also refers to an antenna array (with one or more antenna elements) or a group of antennas. For example, the BS 110 may be coupled with multiple TRPs in different geographical locations to achieve better coverage. The one or more TRPs may be included in a same serving cell or different serving cells. It is to also be understood that the TRP may refer to a logical concept which may be physically implemented by various manner.

Although some embodiments of the present disclosure are described with reference to multiple TRPs for example, these embodiments are only for the purpose of illustration and help those skilled in the art to understand and implement the present disclosure, without suggesting any limitations as to the scope of the present disclosure. It is to be understood that the present disclosure described herein can be implemented in various manners other than the ones described below.

As shown in FIG. 1, for example, the BS 110 may communicate with the UE 120 via TRPs 130-1 and 130-2. In the following, the TRP 130-1 may be also referred to as the first TRP, while the TRP 130-2 may be also referred to as the second TRP. The first TRP 130-1 and the second TRP 130-2 may be included in a same serving cell or different serving cells provided by the BS 110. Although some embodiments of the present disclosure are described with reference to the first TRP 130-1 and the second TRP 130-2 within a same serving cell provided by the BS 110, these embodiments are only for the purpose of illustration and help those skilled in the art to understand and implement the present disclosure, without suggesting any limitations as to the scope of the present disclosure. It is to be understood that the present disclosure described herein can be implemented in various manners other than the ones described below.

The network 100 may support uplink transmissions with multiple repetitions with different digital precoders and beams. For example, the network 100 may support Physical Uplink Control Channel (PUCCH) with multiple repetitions with different digital precoders and beams. For another example, For example, the network 100 may support Physical Uplink Shared Channel (PUSCH) with multiple repetitions with different digital precoders and beams.

In this case, each of the first TRP 130-1 and the second TRP 130-2 may be associated with a group of a digital precoder and a beam. The BS 110 can indicate different digital precoders and beams for different repetitions. The digital precoders may be indicated by two precoder and number of layers or one precoder and number of layers and a second transmission precoder matrix indicator (TPMI) in Downlink Control Information (DCI) for dynamic-grant PUSCH (DG-PUSCH) or by two precodingAndNumberOfLayers or one precodingAndNumberOfLayers and a second TPMI in Radio Resource Control (RRC) for configured-grant PUSCH (CG-PUSCH). The beams may be indicated by two Sounding Reference Signal (SRS) resource indicator (SRI) in DCI for DG-PUSCH and two srs-ResourceIndicator for CG-PUSCH.

In some embodiments, the repetitions may be mapped to beams in cyclic mapping mode or sequential mapping mode. For PUSCH, the UE 120 may transmit Channel State Information (CSI) to a starting repetition for each beam. In other words, the UE 120 may transmit CSI multiplexed with the starting repetition with each beam.

Figure 2A:
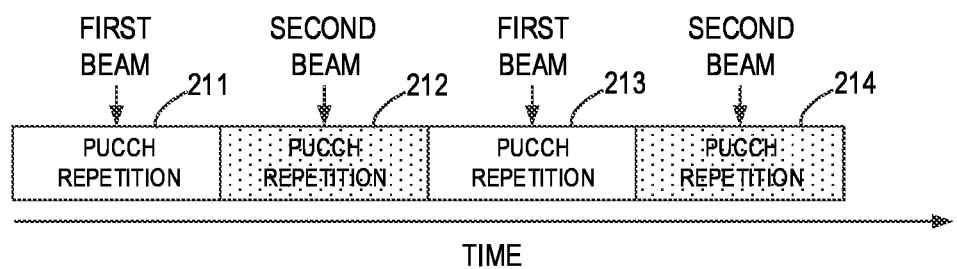
FIG. 2A illustrates a schematic diagram of a cyclic mapping mode for PUCCH repetitions according to some embodiments of the present disclosure.

FIG. 2A illustrates a schematic diagram of a cyclic mapping mode for PUCCH repetitions according to some embodiments of the present disclosure. As shown, in the cyclic mapping mode, PUCCH repetitions 211 and 213 are mapped to a first beam, and PUCCH repetitions 212 and 214 are mapped to a second beam.

Figure 2B:
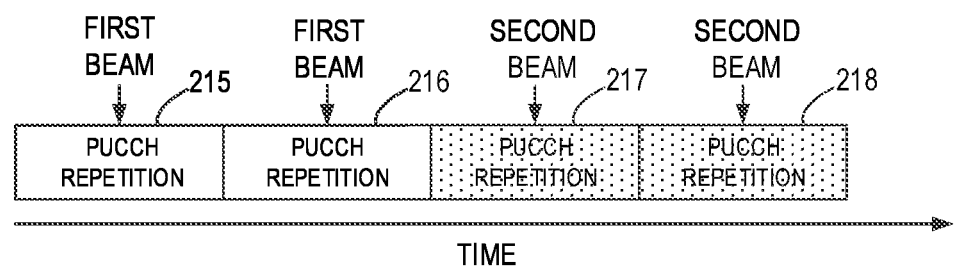
FIG. 2B illustrates a schematic diagram of a sequential mapping mode for PUCCH repetitions according to some embodiments of the present disclosure.

FIG. 2B illustrates a schematic diagram of a sequential mapping mode for PUCCH repetitions according to some embodiments of the present disclosure. As shown, in the sequential mapping mode, PUCCH repetitions 215 and 216 are mapped to the first beam, and PUCCH repetitions 217 and 218 are mapped to the second beam.

Figure 2C:
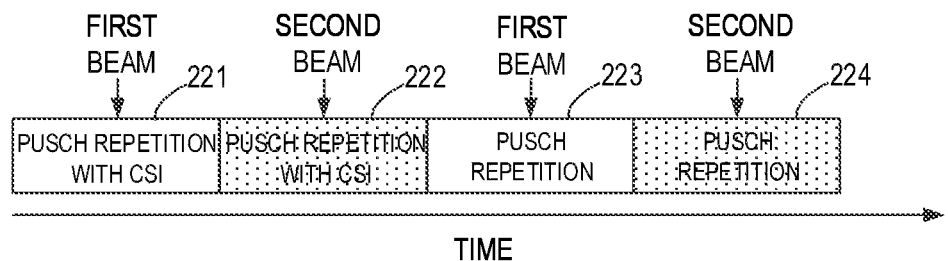
FIG. 2C illustrates a schematic diagram of a cyclic mapping mode for PUSCH repetitions according to some embodiments of the present disclosure.

FIG. 2C illustrates a schematic diagram of a cyclic mapping mode for PUSCH repetitions according to some embodiments of the present disclosure. As shown, a PUSCH repetition 221 is starting repetition for the first beam, and a PUSCH repetition 222 is starting repetition for the second beam. In the cyclic mapping mode, PUSCH repetitions 221 and 223 are mapped to a first beam, and PUSCH repetitions 222 and 224 are mapped to a second beam. CSI is multiplexed with the PUSCH repetition 221 for the first beam, and CSI is multiplexed with the PUSCH repetition 222 for the second beam.

Figure 2D:
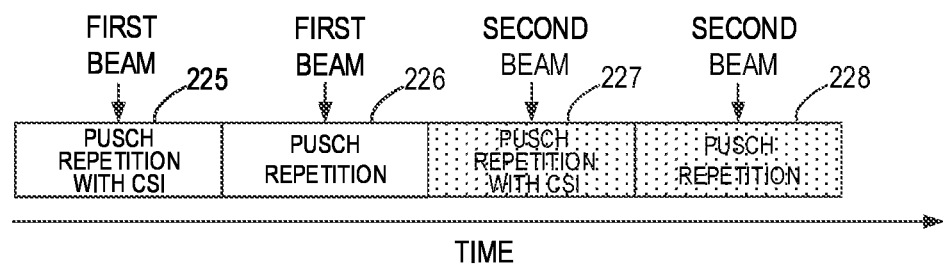
FIG. 2D illustrates a schematic diagram of a sequential mapping mode for PUSCH repetitions according to some embodiments of the present disclosure.

FIG. 2D illustrates a schematic diagram of a sequential mapping mode for PUSCH repetitions according to some embodiments of the present disclosure. As shown, a PUSCH repetition 225 is starting repetition for the first beam, and a PUSCH repetition 227 is starting repetition for the second beam. In the sequential mapping mode, PUSCH repetitions 225 and 226 are mapped to the first beam, and PUSCH repetitions 227 and 228 are mapped to the second beam. CSI is multiplexed with the PUSCH repetition 225 for the first beam, and CSI is multiplexed with the PUSCH repetition 227 for the second beam.

In Release 15 and Release 16, a first minimal CSI processing delay and a second minimal CSI processing delay are defined. Hereinafter, the first and second minimal CSI processing delays are also collectively referred to as a minimal CSI processing delay. For example, Z is defined as an offset between last symbol of Physical Downlink Control Channel (PDCCH) and the first (starting) symbol of CSI report including Timing Advance (TA). For another example, Z' is defined as an offset between last symbol of Channel Measurement Resource (CMR) and Interference Measurement Resource (IMR) and the first (starting) symbol of CSI report including TA. The minimal value of Z and Z' are defined.

Figure 3:
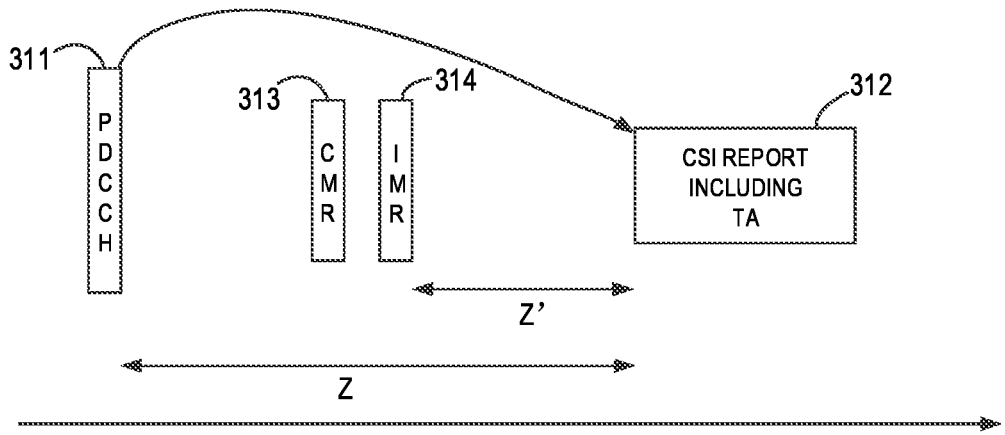
FIG. 3 illustrates a schematic diagram of a minimal CSI processing delay according to some embodiments of the present disclosure.

FIG. 3 illustrates a schematic diagram of a minimal CSI processing delay according to some embodiments of the present disclosure. As shown, Z is defined as an offset between last symbol of PDCCH 311 and the first (starting) symbol of CSI report including Timing Advance (TA) 312. Z' is defined as an offset between last symbol of CMR 313 and IMR 314 and the first (starting) symbol of CSI report including TA 312.

In Release 15 and Release 16, CSI processing unit (CPU) is defined. The UE 120 may process one or more than one CSI measurement and report, which is based on UE capability. The CPU occupancy rule is defined as follows (for CSI report with reportQuantity not set to 'none').

A periodic or semi-persistent CSI report (excluding an initial semi-persistent CSI report on PUSCH after the PDCCH triggering the report) occupies CPU(s) from the first symbol of the earliest one of each CSIRS/CSI-IM/SSB resource for channel or interference measurement, respective latest CSI-RS/CSI-IM/SSB occasion no later than the corresponding CSI reference resource, until the last symbol of the configured PUSCH/PUCCH carrying the report.

An aperiodic CSI report occupies CPU(s) from the first symbol after the PDCCH triggering the CSI report until the last symbol of the scheduled PUSCH carrying the report.

An initial semi-persistent CSI report on PUSCH after the PDCCH trigger occupies CPU(s) from the first symbol after the PDCCH until the last symbol of the scheduled PUSCH carrying the report.

The minimal CSI processing delay limitation may cause the following issues.

Issue 1: the BS scheduling may lead to the case that Z or Z' is within the CSI for PUCCH/PUSCH repetitions. In case 1, the offset Z for some CSI report in the PUCCH/PUSCH repetitions could be within the minimal value of Z. In case 2, the offset Z' between CSI and some CSI report in the PUCCH/PUSCH repetitions could be within minimal value of Z', which will be described with reference to FIG. 3C. In case 3, both case 1 and case 2 happen. In view of the forgoing, how to report the CSI for the corresponding repetitions could be one problem.

Issue 2: for CPU occupancy rule, how to define the number of CPU for case 1/2/3 could be another problem. For CSI in PUSCH, how to determine the CPU occupancy duration could be another problem.

Some embodiments of the present disclosure provide a solution for CSI reporting with repetitions. In this solution, a UE comprises a transceiver configured to communicate with a network and a processer communicatively coupled to the transceiver. The UE determines first CSI and second CSI based on at least one of a previous channel and interference measurement or a latest channel and interference measurement. The UE transmits the first CSI via the transceiver to the network with a first beam. The first CSI is multiplexed with a first repetition of an uplink transmission with the first beam. The UE transmits the second CSI via the transceiver to the network with a second beam. The second CSI is multiplexed with a second repetition of the uplink transmission with the second beam.

Figure 4:
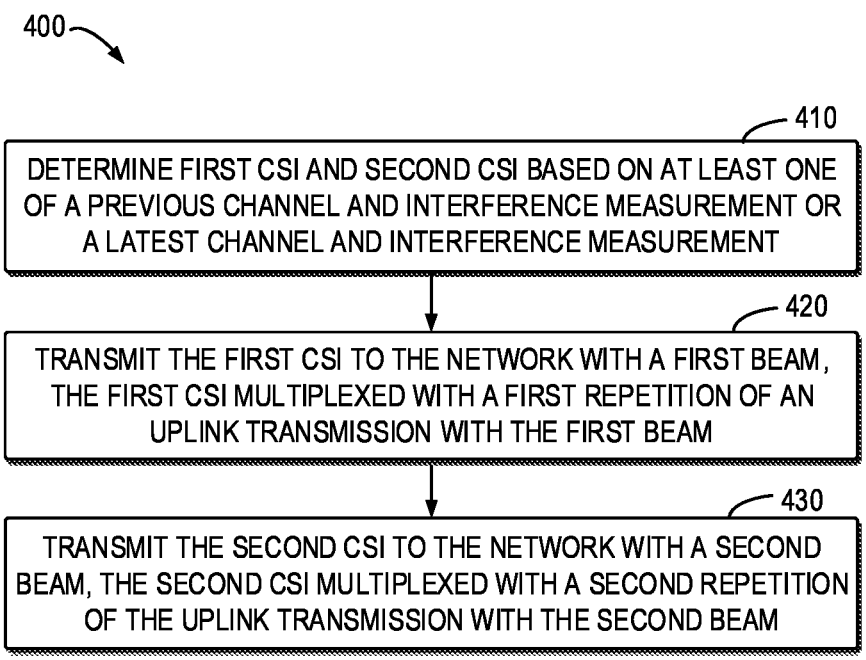
FIG. 4 illustrates a flowchart of an example method for CSI reporting according to some embodiments of the present disclosure.

FIG. 4 illustrates a flowchart of an example method 400 for CSI reporting according to some embodiments of the present disclosure. For the purpose of discussion, the method 400 will be described from the perspective of the UE 120 with reference to FIG. 1.

At block 410, the UE 120 determines first CSI and second CSI based on at least one of a previous channel and interference measurement or a latest channel and interference measurement. As used herein, the previous channel and interference measurement may refer to the last channel and interference measurement that was performed on the condition that first and second minimal CSI processing delays were met. As used herein, the latest channel and interference measurement may refer to the new channel and interference measurement that is performed on the condition that first and second minimal CSI processing delays are met. Hereinafter, CSI that is determined based on the previous channel and interference measurement is referred to as outdated CSI, and CSI that is determined based on the latest channel and interference measurement is referred to as latest CSI.

At block 420, the UE 120 transmits the first CSI to the BS 110 with a first beam. The first CSI is multiplexed with a first repetition of an uplink transmission with the first beam.

At block 430, the UE 120 transmits the second CSI to the BS 110 with a second beam. The second CSI is multiplexed with a second repetition of the uplink transmission with the second beam.

In some embodiments, the UE 120 compares at least one of a first offset and a second offset with a first minimal CSI processing delay. The first offset is between a trigger of CSI reporting and a first starting repetition of the uplink transmission with the first beam. The second offset is between the trigger and a second starting repetition of the uplink transmission with the second beam. the UE 120 compares at least one of a third offset and a fourth offset with a second minimal CSI processing delay. The third offset is between a CSI measurement resource and the first starting repetition, and the fourth offset is between the CSI measurement resource and the second starting repetition. In turn, the UE 120 determines the first CSI and the second CSI based on the comparisons.

In some embodiments, if the UE 120 determines that the first offset is below the first minimal CSI processing delay or the third offset is below the second minimal CSI processing delay, the UE 120 determines the first CSI and the second CSI based on the previous channel and interference measurement. In other words, the UE 120 determines each of the first CSI and the second CSI as outdated CSI. Because the first CSI are the same as the second CSI, the BS 110 may perform joint demodulation of the first CSI and the second CSI. Thus, the demodulation performance may be improved. This will be described with reference to FIG. 5A.

Figure 5A:
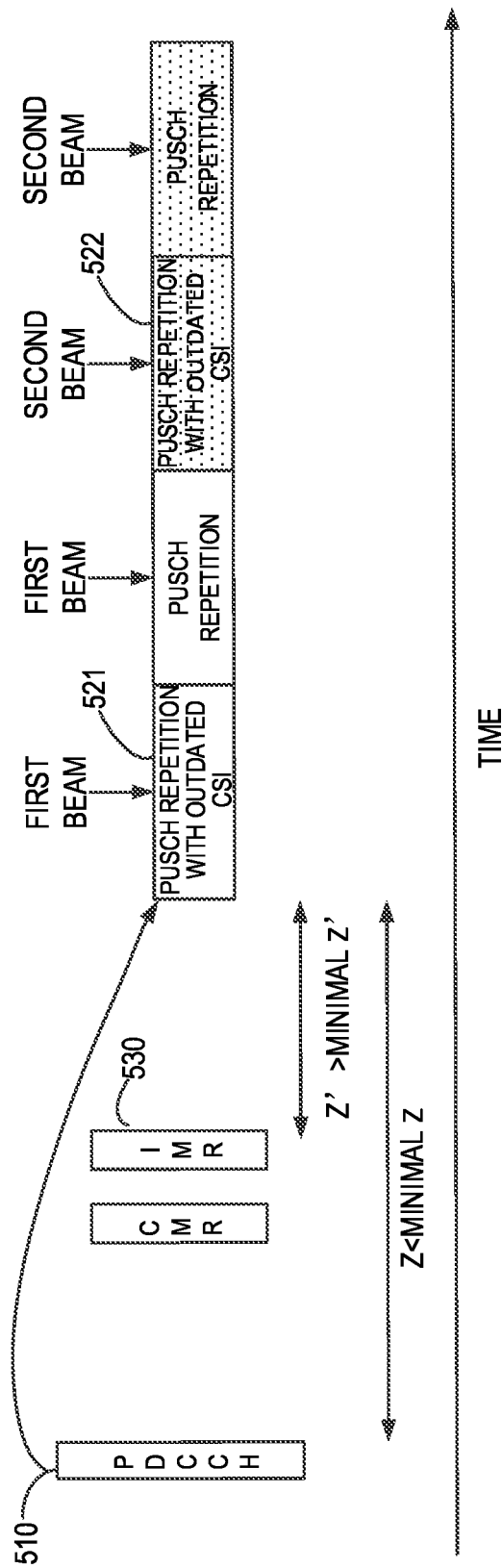
FIG. 5A illustrates a schematic diagram of CSI reporting according to some embodiments of the present disclosure.

FIG. 5A illustrates a schematic diagram of CSI reporting according to some embodiments of the present disclosure. As shown, the UE 120 receives a trigger 510 of CSI reporting on PDCCH from the BS 110. The first offset between the trigger 510 and a first starting repetition 521 of PUSCH transmission with the first beam is below the first minimal CSI processing delay. In other words, the first offset is smaller than the first minimal CSI processing delay (which is also referred to as minimal Z in FIGS. 5A, 5B and 5C). The third offset between a CSI measurement resource 530 and the first starting repetition 521 is above the second minimal CSI processing delay. In other words, the third offset is greater than the second minimal CSI processing delay (which is also referred to as minimal Z' in FIGS. 5A, 5B and 5C). The CSI measurement resource 530 may comprise at least one of CMR and IMR. In this case, both the first and second minimal CSI processing delays are not met. Thus, the UE 120 determines each of the first CSI and the second CSI as outdated CSI. In turn, the UE 120 multiplexes the first CSI (outdated CSI) with the repetition 521 and transmits the first CSI to the BS 110 with the first beam. Similarly, the UE 120 multiplexes the second CSI (outdated CSI) with a repetition 522 and transmits the second CSI to the BS 110 with the second beam.

In some embodiments, if the UE 120 determines that the first offset is below the first minimal CSI processing delay or the third offset is below the second minimal CSI processing delay, the UE 120 determines the first CSI based on the previous channel and interference measurement. If the UE 120 determines that the second offset is above the first minimal CSI processing delay and the fourth offset is above the second minimal CSI processing delay, the UE 120 determines the second CSI based on the latest channel and interference measurement. This will be described with reference to FIG. 5B.

Figure 5B:
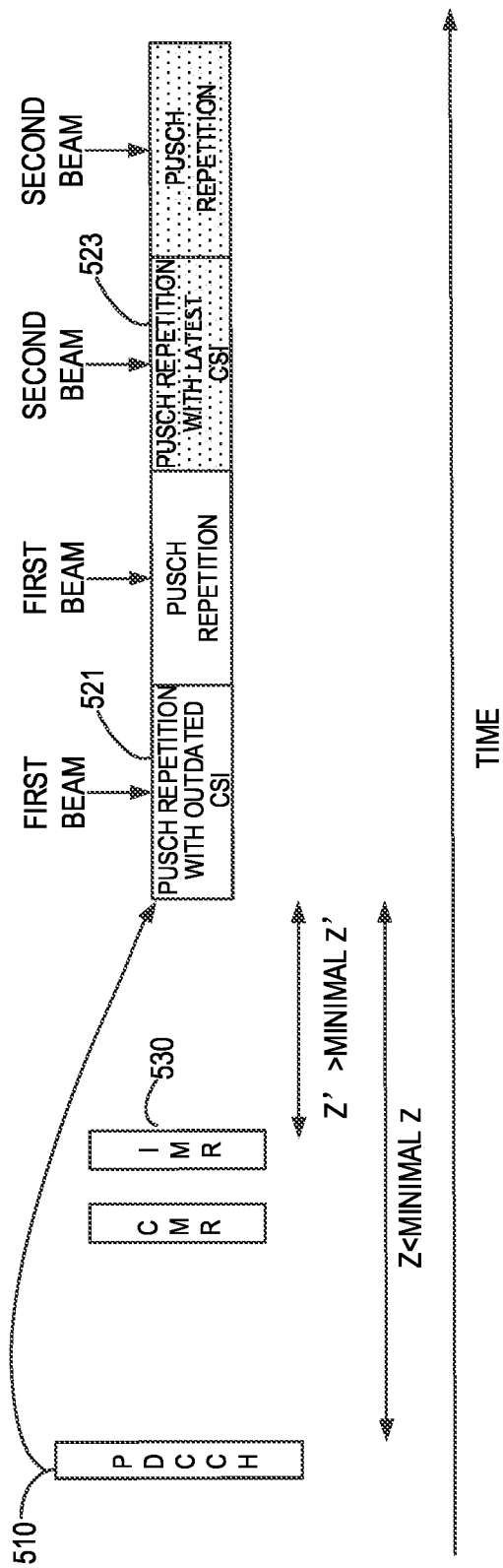
FIG. 5B illustrates a schematic diagram of CSI reporting according to some other embodiments of the present disclosure.

FIG. 5B illustrates a schematic diagram of CSI reporting according to some other embodiments of the present disclosure. Similar to the example as shown in FIG. 5A, the first offset between the trigger 510 and the first starting repetition 521 of PUSCH transmission with the first beam is below the first minimal CSI processing delay. In this case, the UE 120 determines the first CSI as outdated CSI. In addition, the second offset between the trigger 510 and a second starting repetition 523 of PUSCH transmission with the second beam is above the first minimal CSI processing delay. The third offset between the CSI measurement resource 530 and the first starting repetition 521 is above the second minimal CSI processing delay. In this case, the first minimal CSI processing delays is not met, but the second minimal CSI processing delay is met. Thus, the UE 120 determines the second CSI as latest CSI. In turn, the UE 120 multiplexes the first CSI (outdated CSI) with the repetition 521 and transmits the first CSI to the BS 110 with the first beam. The UE 120 multiplexes the second CSI (latest CSI) with the repetition 523 and transmits the second CSI to the BS 110 with the second beam.

In some embodiments, if the UE 120 determines that the first offset is below the first minimal CSI processing delay, the UE 120 determines whether a fifth offset between the trigger and a third repetition of the uplink transmission subsequent to the first starting repetition is above the first minimal CSI processing delay. If the fifth offset is above the first minimal CSI processing delay, the UE 120 determines the first CSI and the second based on the latest channel and interference measurement. In turn, the UE 120 multiplexes the first CSI with the third repetition. In other words, the UE 120 changes the location of CSI report from the starting repetition to a repetition that meets the first minimal CSI processing delay. Thus, both the first CSI and the second CSI are latest CSI. In this way, the BS 110 may obtain more accurate measurements of channel and interference. This will be described with reference to FIG. 5C.

Figure 5C:
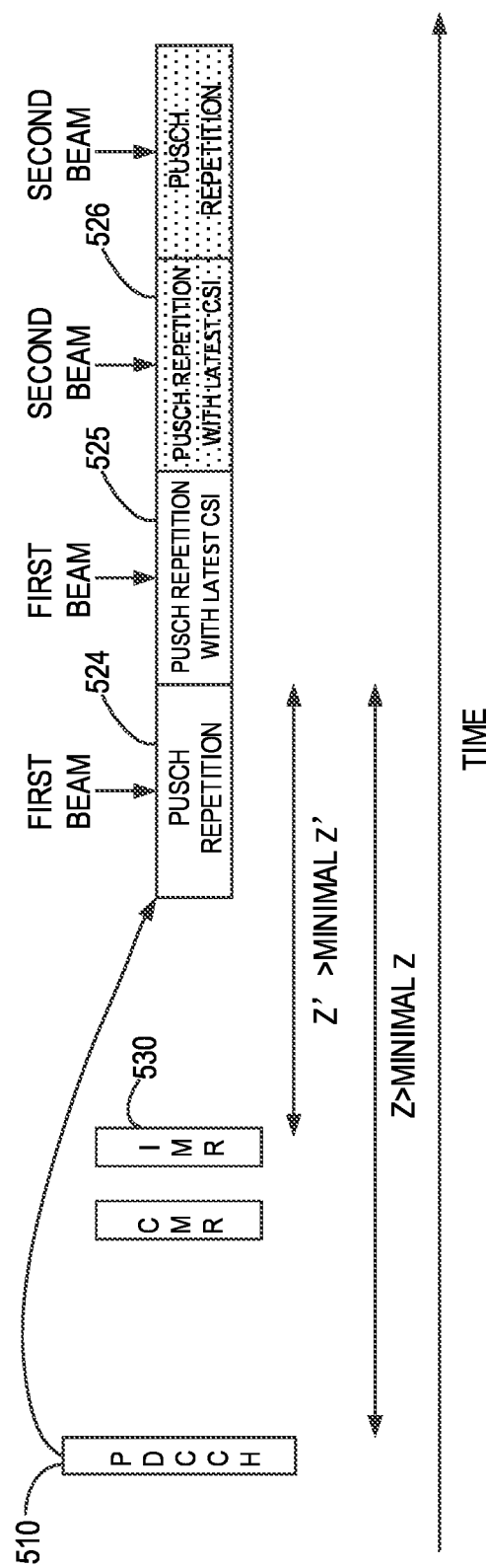
FIG. 5C illustrates a schematic diagram of CSI reporting according to still other embodiments of the present disclosure.

FIG. 5C illustrates a schematic diagram of CSI reporting according to still other embodiments of the present disclosure. In the example as shown in FIG. 5C, the first offset between the trigger 510 and a first starting repetition 524 of PUSCH transmission with the first beam is below the first minimal CSI processing delay. The third offset between the CSI measurement resource 530 and the first starting repetition 521 is above the second minimal CSI processing delay. The UE 120 further determines whether a fifth offset between the trigger 510 and a repetition 525 of the PUSCH transmission subsequent to the first starting repetition 524 is above the first minimal CSI processing delay. In this example, the fifth offset is above the first minimal CSI processing delay. Thus, the UE 120 determines the first CSI and the second based on the latest channel and interference measurement. In turn, the UE 120 multiplexes the first CSI (outdated CSI) with the repetition 525 and the second CSI (outdated CSI) with a repetition 526 of the PUSCH transmission.

In some embodiments, whether to use the solution in FIG. 5A, 5B or 5C may be configured by the BS 110 for the UE 120. In such embodiments, the UE 120 receives at least one CSI reporting configuration from the BS 110. The CSI reporting configuration indicates that the first CSI and the second CSI are expected to be determined based on the at least one of the previous channel and interference measurement or the latest channel and interference measurement. Upon receiving the at least one CSI reporting configuration, the UE 120 may determine the first CSI and the second CSI based on the at least one CSI reporting configuration.

In some embodiments, the BS 110 may transmit the CSI reporting configuration by a radio resource control (RRC) signaling. In some embodiments, the CSI reporting configuration may be common or separate for PUCCH and PUSCH.

In some embodiments, the BS 110 may transmit the CSI reporting configuration by downlink control information (DCI) for scheduling the uplink transmission.

In some embodiments, a separate field may be introduced in the DCI to indicate whether the UE 120 should use the solution in FIG. 5A, 5B or 5C.

In other embodiments, some reserved value of legacy field in conventional DCI may be used. In one example, some reserved value of the second TPMI for digital precoder indication for the second repetition for codebook based transmission may be used. In another example, some reserved value of the second SRIs for digital precoder indication for the second repetition for non-codebook based transmission may be used.

In some embodiments, the UE 120 receives an RRC signaling comprising the at least one CSI reporting configuration, and receives DCI comprising a first CSI reporting configuration of the at least one CSI reporting configuration. In turn, the UE 120 determines the first CSI and the second CSI based on the first CSI reporting configuration. In other words, whether to use the solution in FIG. 5A, 5B or 5C may be configured by the BS 110 by using a combination of a higher layer signaling and the DCI for scheduling the uplink transmission. For example, the BS 110 may indicate the solutions in FIGS. 5A, 5B and 5C by using a higher layer signaling. The BS 110 may indicate one of the solutions in FIGS. 5A, 5B and 5C to be used by the UE 120 by using PUSCHTimeDomainResourceAllocation or PUSCH-Allocation or PUCCH resource allocation.

In some embodiments, the UE 120 may determine whether to use the solution in FIG. 5A, 5B or 5C autonomously. For example, the UE 120 may determine whether to use the solution in FIG. 5A, 5B or 5C based on capability of the UE 120.

In some embodiments, the UE 120 may report to the BS 110 whether to use the solution in FIG. 5A, 5B or 5C. In some embodiments, the UE 120 may transmit a fourth signaling via the transceiver to the BS 110. The fourth signaling comprises one of the following: a fifth indication that both the first CSI and the second CSI are determined based on the previous channel and interference measurement, a sixth indication that both the first CSI and the second CSI are determined based on the latest channel and interference measurement, or a seventh indication that the first CSI is determined based on the previous channel and interference measurement, and the second CSI is determined based on the latest channel and interference measurement.

In some embodiments, the fourth signaling comprises one of RRC signaling or Media Access Control (MAC) control element (CE).

In some embodiments, the fourth signaling comprises uplink control information. For example, whether to use the solution in FIG. 5A, 5B or 5C may be indicated by PUSCH/PUCCH DMRS sequence. In one example, different scramble ID may correspond to different solutions in FIGS. 5A, 5B and 5C, and the BS 110 may detect whether the solution in FIG. 5A, 5B or 5C is used blindly.

As mentioned above, for CPU occupancy rule, how to define the number of CPU for case 1, 2 and 3 could be another problem. In order to solve the problem of how to define the number of CPU for the CSI report with outdated CSI, the UE 120 may employ the following options:

Option 1: 0 CPU is counted for the outdated CSI.

Option 2: X (X>0) CPU is counted for the outdated CSI, where X is determined by the reportQuantity as defined in 3GPP specification 38.214.

In some embodiments, the UE 120 may report to the BS 110 whether to use the option 1 or option 2. For example, the UE 120 may transmit a first signaling to the BS 110. The first signaling may comprises a first indication that the number of CSI processing units that are occupied by processing of outdated CSI is zero. Alternatively, the first signaling may comprises a second indication that the number of CSI processing units that are occupied by processing of outdated CSI is determined based on contents of the outdated CSI.

In some embodiments, whether to use option 1 or option 2 can be configured by higher layer signaling and/or DCI.

In some embodiments, whether to use option 1 or option 2 is determined based on whether UE reports latest CSI in a PUCCH/PUSCH repetition, i.e. whether the solution in FIG. 5A or 5B is selected.

As mentioned above, for CSI in PUSCH, how to determine the CPU occupancy duration could be another problem. In order to solve the problem, the UE 120 may employ the following options:

Option 1: CPU corresponding to the CSI report is not occupied.

Option 2: CPU corresponding to the CSI report is occupied.

Option 3: whether to use option 1 or 2 may be reported by the UE 120.

Option 4: whether to use option 1 or 2 may be configured by higher layer signaling and/or DCI.

Option 5: whether to use option 1 or 2 may be determined by whether there is a PUSCH repetitions with CSI after this repetition.

If option 3 is used, the UE 120 may transmit to the BS 110 a second signaling comprising one of the following: a third indication that the number of CSI processing units that are occupied by processing of the repetition without the CSI is zero, or a fourth indication that the number of CSI processing units that are occupied by processing of the repetition without the CSI is non-zero.

Figure 5D:
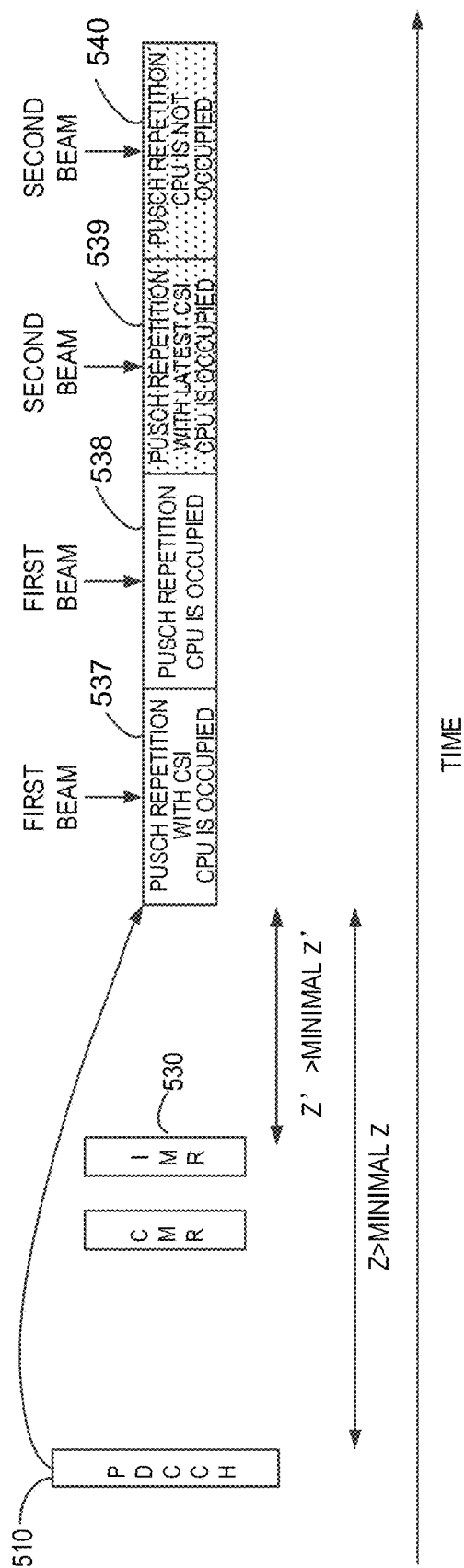
FIG. 5D illustrates a schematic diagram of CSI reporting according to still other embodiments of the present disclosure.

FIG. 5D illustrates a schematic diagram of CSI reporting according to option 5. As shown, each of PUSCH repetitions 537 and 539 is multiplexed with CSI, and thus CPUs corresponding to the PUSCH repetitions 537 and 539 are occupied. Each of PUSCH repetitions 538 and 540 is not multiplexed with CSI. Because there is the PUSCH repetition 539 with CSI after the PUSCH repetition 538, CPU corresponding to the PUSCH repetition 538 is occupied. Because there are no PUSCH repetitions with CSI after the PUSCH repetition 540, CPU corresponding to the PUSCH repetition 540 is not occupied.

Some embodiments of the present disclosure provide a solution for dynamic switching between transmission schemes. In this solution, a UE comprises a transceiver configured to communicate with a network and a processor communicatively coupled to the transceiver. The UE receives first information concerning at least one group of beams and digital precoders via the transceiver from the network. The UE generates repetitions of an uplink transmission based on the first information and transmits the repetitions via the transceiver to the network.

Figure 6:
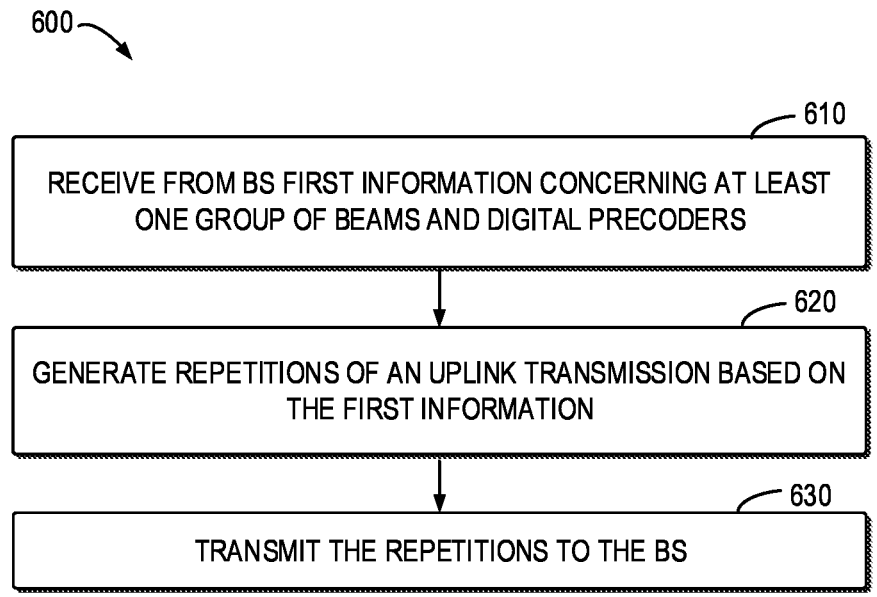
FIG. 6 illustrates a flowchart illustrating an example method of dynamic switching between transmission schemes according to some embodiments of the present disclosure.

FIG. 6 illustrates a flowchart of an example method 600 for dynamic switching between transmission schemes according to some embodiments of the present disclosure. For the purpose of discussion, the method 600 will be described from the perspective of the UE 120 with reference to FIG. 1.

At block 610, the UE 120 receives first information concerning at least one group of beams and digital precoders from the BS 110. At block 620, the UE 120 generates repetitions of an uplink transmission based on the first information. At block 630, the UE 120 transmits the repetitions to the BS 110.

In some embodiments, the at least one group of beams and digital precoders comprises one group of beams and digital precoders, for example, a first group of a first beam and a first digital precoder associated with the first beam.

In some embodiments, the at least one group of beams and digital precoders comprises two groups of beams and digital precoders. For example, the two groups of beams and digital precoders may comprise the first group of the first beam and the first digital precoder, and a second group of a second beam and a second digital precoder associated with the second beam.

In some embodiments, before receiving the first information concerning at least one group of beams and digital precoders, the UE 120 may receive DCI for scheduling the uplink transmission. In such embodiments, the DCI may indicate both of the first and second groups of beams and digital precoders. The first group may be associated with a first predefined field in the DCI, and the second group may be associated with a second predefined field in the DCL. Upon receiving the first information, the UE 120 may get to know whether one or both of the first and second groups is to be used for the uplink transmission.

As mentioned above, each of the first TRP 130-1 and the second TRP 130-2 may be associated with a group of beams and digital precoders. In the case where the at least one group of beams and digital precoders only comprises the first group of the first beam and the first digital precoder, the UE 120 may perform transmission to one of the first TRP 130-1 and the second TRP 130-2. In the case where the at least one group of beams and digital precoders comprises the first group and the second group, the UE 120 may perform transmission to both of the first TRP 130-1 and the second TRP 130-2. As such, based on the information concerning the at least one group of beams and digital precoders, the UE 120 may dynamically switch between transmission to a single TRP and transmission to multi-TRP.

Regarding the transmission to the single TRP, the BS 110 may provide control signaling for the UE 120 to support a subset of or all the following transmission schemes.

Scheme 1: all repetitions are generated based on the first beam and the first precoder.

Scheme 2: all repetitions are generated based on the second beam and the second precoder.

Regarding the transmission to the multi-TRP, the BS 110 may provide control signaling for the UE 120 to support a subset of or all the following transmission schemes:

Scheme 3: all repetitions are generated based on the both beams/precoders with cyclic mapping. Scheme 3 may comprise the following two schemes.

Scheme 3a: the starting repetition is mapped to the first beam and the first precoder.

Scheme 3b: the starting repetition is mapped to the second beam and the second precoder.

It is to be understood that whether to select the scheme 3a or 3b when scheme 3 is configured may be predefined or configured by the BS 110.

Scheme 4: all repetitions are generated based on the both beams and precoders with sequential mapping. Scheme 4 may comprise the following two schemes.

Scheme 4a: the starting repetition is mapped to the first beam and the first precoder.

Scheme 4b: the starting repetition is mapped to the second beam and the second precoder.

It is to be understood that whether to select the scheme 4a or 4b when scheme 4 is configured may be predefined or configured by the BS 110.

In some embodiments, UE capability may be introduced to report which scheme(s) the UE 120 supports It is to be understood that the repetition could indicate nominal repetition or actual repetition.

In some embodiments, the UE 120 may not transmit nominal repetition due to slot format restriction or uplink signal collision.

In some embodiments, for DG-PUSCH, the following options 1 to 3 are provided to dynamically switch the above schemes.

Option 1: cyclic mapping and sequential mapping is configured by RRC signaling.

Whether to select scheme 1, 2, 3 or 4 is dynamically indicated by the BS 110.

Option 1-1: an independent field may be introduced to indicate one of the above transmission schemes, for example scheme 1, 2, 3 or 4. This field may or may not indicate whether it is 3a/4a or 3b/4b is selected.

In one example, the indication could be:
"00" indicating that scheme 1 is selected;
"01" indicating that scheme 2 is selected;
"10" indicating that scheme 3a or 4a is selected, whether to select scheme 3a or 4a depends on a signaling indicating the mapping mode;
"11" indicating that scheme 3b or 4b is selected, whether to select scheme 3b or 4b depends on a signaling indicating the mapping mode;

Option 1-2: the scheme 1, 2 or 3 or 4 may be indicated in the TDRA configuration.

In one example, a field "sriPrecoders" may be added, where the default value indicates that all repetitions are generated based on the first beam and the first precoder.

The candidate value of the field "sriPrecoders" may or may not include the indication of scheme 3a/4a or 3b/4b.

Different code-point of TDRA in DCI Format 0_1/0_2 may select different TDRA configuration configured by RRC signaling.

An example for option 1-2 is described below.

```
PUSCH-Allocation-r16 ::= SEQUENCE {
  mappingType-r16 ENUMERATED {typeA, typeB} OPTIONAL,
  -- Cond NotFormat01-02-Or-TypeA
  startSymbolAndLength-r16 INTEGER (0..127) OPTIONAL,
  -- Cond NotFormat01-02-Or-TypeA
  startSymbol-r16 INTEGER (0..13) OPTIONAL,
  -- Cond RepTypeB
  length-r16 INTEGER (1..14) OPTIONAL,
  -- Cond RepTypeB
  numberOfRepetitions-r16 ENUMERATED {n1, n2, n3, n4, n7, n8, n12, n16}
OPTIONAL,
  -- Cond Format01-02
  sriPrecoders ENUMERATED {SRI2_TPMI2, SRI_TPMI1_AND_SRI_TPMI2,
SRI_TPMI2_AND_SRI_TPMI1} OPTIONAL, -- Cond Format01-02
  ...
}
```

In some embodiments, the following options are provided to dynamically switch the above schemes.

Option 2: all the schemes are indicated by DCI.

Option 2-1: an independent field may be introduced to indicate the transmission scheme. This field may or may not indicate whether the scheme 3a/4a or 3b/4b is selected.

In one example, the indication may be:
"00" indicating that scheme 1 is selected;
"01" indicating that scheme 2 is selected;
"10" indicating that scheme 3 is selected;
"11" indicating that scheme 4 is selected.

A separate filed may or may not be introduced to indicate whether scheme 3a/4a or 3b/4b is selected.

In another example, the indication may be:
"000" indicating that scheme 1 is selected;
"001" indicating that scheme 2 is selected;
"010" indicating that scheme 3a is selected;
"011" indicating that scheme 3b is selected;
"100" indicating that scheme 4a is selected;
"101" indicating that scheme 4b is selected;
"110" and "111" that are reserved.

Option 2-2: the transmission scheme may be indicated in the TDRA configuration.

In one example, a field "sriPrecoders" may be added, where the default value indicates that all repetitions are generated based on the first beam and the first precoder.

The candidate value of the field may or may not include the indication of scheme 3a/4a or 3b/4b.

Different code-point of TDRA in DCI Format 0_1/0_2 may select different TDRA configuration configured by RRC signaling.

An example for option 2-2 is described below.

```
PUSCH-Allocation-r16 ::= SEQUENCE {
  mappingType-r16 ENUMERATED {typeA, typeB} OPTIONAL,
  -- Cond NotFormat01-02-Or-TypeA
  startSymbolAndLength-r16 INTEGER (0..127) OPTIONAL,
  -- Cond NotFormat01-02-Or-TypeA
  startSymbol-r16 INTEGER (0..13) OPTIONAL,
  -- Cond RepTypeB
  length-r16 INTEGER (1..14) OPTIONAL,
  -- Cond RepTypeB
  numberOfRepetitions-r16 ENUMERATED {n1, n2, n3, n4, n7, n8, n12, n16}
OPTIONAL,
  -- Cond Format 01-02
  sriPrecoders ENUMERATED {SRI2_TPMI2,
    SRI_TPMI1_AND_SRI_TPMI2_CYCLIC_MAPPING,
SRI_TPMI1_AND_SRI_TPMI2_SEQUENTIAL_MAPPING,
    SRI_TPMI2_AND_SRI_TPMI1_CYCLIC_MAPPING,
SRI_TPMI2_AND_SRI_TPMI1_SEQUENTIAL_MAPPING} OPTIONAL, -- Cond
    Format01-02
  ...
}
```

Option 3: on top of option 1 and option 2, some information for scheme selection, for example, the scheme a or b, may be determined by resource allocation information for the scheduling signaling.

Option 3-1, whether to choose scheme a/b when scheme 3/4 is selected can be determined by a starting control channel element (CCE) index. For example, an odd starting CCE index may indicate scheme a and an even starting CCE index may indicate scheme b.

Option 3-2, whether to select scheme 1 or 2 when single-TRP operation is selected can be determined by the starting CCE index. For example, an odd starting CCE index may indicate scheme 1 and an even starting CCE index may indicate scheme 2.

Option 3-3: a combination of Option 3-1 and Option 3-2, where one indicator can be introduced to indicate whether single-TRP operation or multi-TRP operation is selected.

Alternatively, whether single-TRP operation or multi-TRP operation is selected may be indicated in TDRA.

In some embodiments, the following options are provided for dynamic switching between single-TRP and multi-TRP for CG-PUSCH.

Option 1: similar to option 1-2 and 2-2 regarding DG-PUSCH, the transmission scheme 1, 2, 3 or 4 may be configured in TDRA.

MAC CE or group cast or unicast DCI may be introduced to update the TDRA for the CG-PUSCH.

For example, the MAC CE having the following format may be employed.

| Bit 1 | Bit 2 | Bit 3 | Bit 4 | Bit 5 | Bit 6 | Bit 7 | Bit 8 |
|---|---|---|---|---|---|---|---|
| R | R | R | R | R | R | BWP ID | |
| | | Serving cell ID | | | SRI and preceder mapping scheme | | |

In the above format, R represents a reserved bit, BWP ID represents bandwidth part index, Serving cell ID represents serving cell index, and SRI and preceder mapping scheme represents one of the schemes selected from schemes 1, 2, 3a, 3b, 4a and 4b.

Option 2: the transmission scheme may be changed by MAC CE or group cast or unicast DCI.

Option 3: the BS 110 may deactivate the SRS resources by MAC CE or group cast or unicast DCI.

In one example, the BS 110 may indicate an invalid beam for a SRS, and the UE 120 should transmit CG-PUSCH based on the valid SRI to fallback to single-TRP operation In some embodiments, for group cast DCI, the BS 110 may configure the RNTI for a group of UEs, where certain fields are allocated for one UE, and the field index may be configured by higher layer signaling. For example, the group cast DCI having the following format may be employed.

SRI and precoder mapping scheme 1 (for UE 1, 2 or 3 bits)
SRI and precoder mapping scheme 2 (for UE 2, 2 or 3 bits)
. . .
SRI and precoder mapping scheme N (for UE N, 2 or 3 bits)

In some embodiments, for unicast DCI, some fields may be inserted in legacy DCI Format 0_1/0_2 or new unicast DCI Format may be introduced, which is based on C-RNTI/MCS-C-RNTI or a RNTI configured by RRC.

In some embodiments, the UE 120 may receive first DCI comprising a predefined field. The predefined field indicates the at least one group of beams and digital precoders.

In some embodiments, the UE 120 may receive second DCI comprising a Time Domain Resource Allocation (TDRA) code-point. The TDRA code-point indicates the at least one group of beams and digital precoders.

In some embodiments, the first information comprises information concerning the number of the at least one group of beams and digital precoders. In such embodiments, if the number is equal to one, the UE 120 determines whether the at least one group is associated with a first predefined field in a first signaling for scheduling the uplink transmission based on resource allocation information in the first signaling. If the at least one group is associated with the first predefined field, the UE 120 generates the repetitions based on the at least one group.

In some embodiments, the first information comprises information concerning the number of the at least one group of beams and digital precoders. In such embodiments, if the number is equal to two, the UE 120 determines whether a first group of the at least one group is associated with a second predefined field in a second signaling for scheduling the uplink transmission based on resource allocation information in the second signaling. If the first group is associated with the second predefined field, the UE 120 generates a starting repetition of the repetitions based on the first group.

In embodiments where the at least one group of beams and digital precoders comprises two groups of beams and digital precoders, the UE 120 may receive second information concerning a mapping mode from the BS 110. Alternatively, the first information itself comprises information concerning the mapping mode. The UE 120 may map the repetitions to the two groups of beams and digital precoders based on the information concerning the mapping mode.

Figure 7:
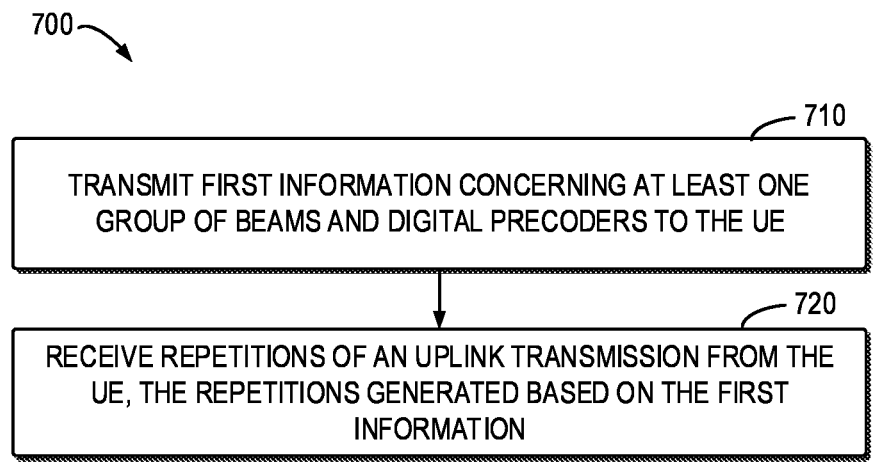
FIG. 7 illustrates a flowchart illustrating an example method of dynamic switching between transmission schemes according to some other embodiments of the present disclosure.

FIG. 7 illustrates a flowchart of an example method 700 for dynamic switching between transmission schemes according to some embodiments of the present disclosure. For the purpose of discussion, the method 700 will be described from the perspective of the BS 110 with reference to FIG. 1.

At block 710, the BS 110 transmits first information concerning at least one group of beams and digital precoders to the UE 120. At block 720, the BS 110 receives repetitions of an uplink transmission from the UE 120. The repetitions are generated based on the first information.

In some embodiments, the at least one group of beams and digital precoders comprises two groups of beams and digital precoders.

In some embodiments, the BS 110 transmits second information concerning a mapping mode to the UE 120. In such embodiments, the repetitions are mapped to the two groups of beams and digital precoders based on the second information.

In some embodiments, the BS 110 transmits the second information by transmitting a radio resource control signaling comprising the second information.

In some embodiments, the first information comprises third information concerning a mapping mode. In such embodiments, the repetitions are mapped to the two groups of beams and digital precoders based on the first information.

In some embodiments, the BS 110 transmits first downlink control information comprising a predefined field to the UE 120. The predefined field indicates the at least one group of beams and digital precoders.

In some embodiments, the BS 110 transmits second downlink control information comprising a Time Domain Resource Allocation (TDRA) code-point to the UE 120. The TDRA code-point indicates the at least one group of beams and digital precoders.

In some embodiments, the first information comprises information concerning the number of the at least one group of beams and digital precoders.

Figure 8:
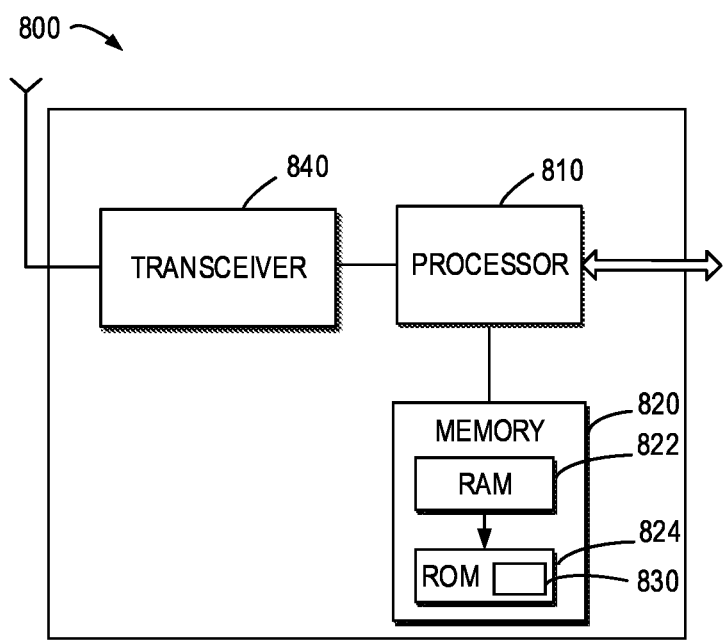
FIG. 8 illustrates a simplified block diagram of a device that is suitable for implementing embodiments of the present disclosure.

FIG. 8 is a simplified block diagram of a device 800 that is suitable for implementing embodiments of the present disclosure. For example, the BS 110 and the UE 120 can be implemented by the device 800. As shown, the device 800 includes a processor 810, a memory 820 coupled to the processor 810, and a transceiver 840 coupled to the processor 810.

The transceiver 840 is for bidirectional communications. The transceiver 840 is coupled to at least one antenna to facilitate communication. The transceiver 840 can comprise a transmitter circuitry (e.g., associated with one or more transmit chains) and/or a receiver circuitry (e.g., associated with one or more receive chains). The transmitter circuitry and receiver circuitry can employ common circuit elements, distinct circuit elements, or a combination thereof.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the ROM 824. The processor 810 may perform any suitable actions and processing by loading the program 830 into the RAM 822.

The embodiments of the present disclosure may be implemented by means of the program 830 so that the device 800 may perform any method of the disclosure as discussed with reference to FIGS. 4, 6 and 7. The embodiments of the present disclosure may also be implemented by hardware or by a combination of software and hardware.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400 as described above with reference to FIG. 4 and/or the method 600 as described above with reference to FIG. 6 and/or the method 700 as described above with reference to FIG. 7.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A user equipment (UE), comprising:
   a transceiver configured to communicate with a network; and
   a processor communicatively coupled to the transceiver and configured to perform operations comprising:
   determining first Channel State Information (CSI) and second CSI based on at least one of a previous channel and interference measurement or a latest channel and interference measurement, wherein determining the first CSI and the second CSI comprises:
   comparing at least one of a first offset and a second offset with a first minimal CSI processing delay, the first offset being between a trigger of CSI reporting and a first starting repetition of the uplink transmission with the first beam, and the second offset being between the trigger and a second starting repetition of the uplink transmission with the second beam;
   comparing at least one of a third offset and a fourth offset with a second minimal CSI processing delay, the third offset being between a CSI measurement resource and the first starting repetition, and the fourth offset being between the CSI measurement resource and the second starting repetition; and
   determining the first CSI and the second CSI based on the comparisons;
   transmitting the first CSI via the transceiver to the network with a first beam, the first CSI multiplexed with a first repetition of an uplink transmission with the first beam; and
   transmitting the second CSI via the transceiver to the network with a second beam, the second CSI multiplexed with a second repetition of the uplink transmission with the second beam.

2. The UE of claim 1, wherein determining the first CSI and the second CSI based on the comparisons comprises:
   in accordance with a determination that the first offset is below the first minimal CSI processing delay or the third offset is below the second minimal CSI processing delay, determining the first CSI and the second CSI based on the previous channel and interference measurement.

3. The UE of claim 2, wherein the operations further comprise:
   transmitting a first signaling via the transceiver to the network, the first signaling comprising one of the following:
   a first indication that a number of CSI processing units that are occupied by processing of the first CSI and the second CSI is zero, or
   a second indication that the number of CSI processing units that are occupied by processing of the first CSI and the second CSI is determined based on contents of the first CSI and the second CSI.

4. The UE of claim 1, wherein determining the first CSI and the second CSI based on the comparison comprises:
   in accordance with a determination that the first offset is below the first minimal CSI processing delay or the third offset is below the second minimal CSI processing delay, determining the first CSI based on the previous channel and interference measurement; and
   in accordance with a determination that the second offset is above the first minimal CSI processing delay and the fourth offset is above the second minimal CSI processing delay, determining the second CSI based on the latest channel and interference measurement.

5. The UE of claim 1, wherein determining the first CSI and the second CSI based on the comparison comprises:
  in accordance with a determination that the first offset is below the first minimal CSI processing delay and the third offset is above the second minimal CSI processing delay, determining whether a fifth offset between the trigger and a third repetition of the uplink transmission subsequent to the first starting repetition is above the first minimal CSI processing delay; and
  in accordance with a determination that the fifth offset is above the first minimal CSI processing delay, determining the first CSI and the second based on the latest channel and interference measurement; and
  wherein transmitting the first CSI comprises transmitting the first CSI multiplexed with the third repetition.

6. The UE of claim 1, wherein the operations further comprise:
  transmitting via the transceiver to the network a fourth repetition of the uplink transmission without the first CSI with the first beam; and
  transmitting a second signaling via the transceiver to the network, the second signaling comprising one of the following:
    a third indication that a number of CSI processing units that are occupied by processing of the fourth repetition is zero, or
    a fourth indication that the number of CSI processing units that are occupied by processing of the fourth repetition is non-zero.

7. The UE of claim 1, wherein the operations further comprise:
  receiving at least one CSI reporting configuration via the transceiver from the network, the CSI reporting configuration indicating that the first CSI and the second CSI are expected to be determined based on the at least one of the previous channel and interference measurement or the latest channel and interference measurement; and
  wherein determining the first CSI and the second CSI comprises:
    determining the first CSI and the second CSI based on the at least one CSI reporting configuration.

8. The UE of claim 7, wherein receiving the at least one CSI reporting configuration comprises:
  receiving a radio resource control signaling comprising the at least one CSI reporting configuration.

9. The UE of claim 7, wherein receiving the at least one CSI reporting configuration comprises:
  receiving downlink control information for scheduling the uplink transmission, the downlink control information comprising the at least one CSI reporting configuration.

10. The UE of claim 7, wherein receiving the at least one CSI reporting configuration comprises:
  receiving a radio resource control signaling comprising the at least one CSI reporting configuration; and
  receiving downlink control information comprising a first CSI reporting configuration; and
  wherein determining the first CSI and the second CSI comprises:
    determining the first CSI and the second CSI based on the first CSI reporting configuration.

11. The UE of claim 1, wherein the operations further comprise:
  transmitting a fourth signaling via the transceiver to the network, the fourth signaling comprising one of the following:
    a fifth indication that both the first CSI and the second CSI are determined based on the previous channel and interference measurement,
    a sixth indication that both the first CSI and the second CSI are determined based on the latest channel and interference measurement, or
    a seventh indication that the first CSI is determined based on the previous channel and interference measurement, and the second CSI is determined based on the latest channel and interference measurement.

12. A user equipment (UE), comprising:
  a processor communicatively
  coupled to the transceiver and configured to perform operations comprising:
    receiving downlink control information (DCI) via the transceiver from the network, wherein the DCI comprises a field, the field indicating two groups of beams and digital precoders;
    receiving a radio resource control (RRC) message indicating a mapping mode, wherein the mapping mode is one of cyclic mapping or sequential mapping;
    selecting one of a plurality of transmission schemes, based on the field indicating the two groups of digital beams and precoders and the mapping mode;
    generating repetitions of an uplink transmission based on the selected transmission scheme; and
    transmitting the repetitions via the transceiver to the network.

13. The UE of claim 12, further comprising:
  receiving information concerning a number of the two groups of beams and digital precoders; and
  wherein generating the repetitions comprises:
    in accordance with a determination that the number is equal to two, determining whether a first group of the at least one group is associated with a second predefined field in a second signaling for scheduling the uplink transmission based on resource allocation information in the second signaling; and
    in accordance with a determination that the first group is associated with the second predefined field, generating a starting repetition of the repetitions based on the first group.

14. The UE of claim 12, wherein the uplink transmission comprises channel state information (CSI).

15. The UE of claim 12, wherein the DCI is for a dynamic grand (DG) physical uplink shared channel (PUSCH).

16. The UE of claim 12, wherein the first group of beams and digital precoders corresponds to a first sounding reference signal (SRS) resource indication (SRI) and a second group of beams and digital precoders corresponds to a second SRI.

17. The UE of claim 12, wherein when the predefined field indicates a codepoint "00", selecting a first transmission scheme from the plurality of transmission schemes, wherein the first transmission scheme includes generating repetitions based on a first beam and digital precoder of the two groups of beams and digital precoders.

18. The UE of claim 12, wherein when the predefined field indicates a codepoint "01", selecting a second transmission scheme from the plurality of transmission schemes, wherein the second transmission scheme includes generating repetitions based on a second beam and digital precoder of the two groups of beams and digital precoders.

19. The UE of claim 12, wherein when the predefined field indicates a codepoint "10", selecting one of a third or fourth transmission scheme from the plurality of transmission schemes, wherein the third and fourth transmission schemes include generating repetitions that are to be mapped to the two groups of beams and digital precoders based on the mapping mode.

20. The UE of claim 12, wherein when the predefined field indicates a codepoint "11", selecting one of a fifth or sixth transmission scheme from the plurality of transmission schemes, wherein the fifth or sixth transmission schemes include generating repetitions that are to be mapped to the two groups of beams and digital precoders based on the mapping mode.

* * * * *